(12) United States Patent
Ma et al.

(10) Patent No.: US 9,886,879 B2
(45) Date of Patent: Feb. 6, 2018

(54) LIQUID CRYSTAL DISPLAY AND METHOD FOR TESTING LIQUID CRYSTAL DISPLAY

(71) Applicants: Chengdu Tianma Micro-Electronics Co., Ltd., Sichuan (CN); Tianma Micro-Electronics Co., Ltd., Shenzhen (CN)

(72) Inventors: Mouxing Ma, Sichuan (CN); Bo Wu, Sichuan (CN); Zhijie Zou, Sichuan (CN); Yingru Hu, Sichuan (CN)

(73) Assignees: CHENGDU TIANMA MICRO-ELECTRONICS CO., LTD., Chengdu, Sichuan (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 275 days.

(21) Appl. No.: 14/217,185

(22) Filed: Mar. 17, 2014

(65) Prior Publication Data

US 2015/0109018 A1    Apr. 23, 2015

(30) Foreign Application Priority Data

Oct. 17, 2013 (CN) .......................... 2013 1 0488181

(51) Int. Cl.
  *G09G 3/00*     (2006.01)
  *G02F 1/1365*   (2006.01)
  *G09G 3/36*     (2006.01)

(52) U.S. Cl.
  CPC .......... *G09G 3/006* (2013.01); *G02F 1/1365* (2013.01); *G09G 3/3677* (2013.01);
  (Continued)

(58) Field of Classification Search
CPC .. G09G 3/3677; G09G 3/006; G09G 2320/02; G09G 2330/12; G09G 2330/08; G02F 1/1365
See application file for complete search history.

(56) References Cited

U.S. PATENT DOCUMENTS 6,670,953 B1    12/2003  Ozawa
2002/0075248 A1*  6/2002  Morita ................. G09G 3/3648
                                                         345/204

(Continued)

FOREIGN PATENT DOCUMENTS

CN        1287650 A    3/2001
CN        1800926 A    7/2006

(Continued)

OTHER PUBLICATIONS

First Office Action as issued in corresponding Chinese Application No. 201310488181.2, dated Mar. 1, 2016.

*Primary Examiner* — Patrick Assouad
*Assistant Examiner* — Haidong Zhang
(74) *Attorney, Agent, or Firm* — Alston & Bird LLP

(57) ABSTRACT

A liquid crystal display and a method for testing the liquid crystal display are disclosed. The liquid crystal display includes a TFT substrate including M scan lines and N data lines, a drive power line, and a switch unit adapted to connect the drive power line to the M scan lines under control of a control signal during a detection of a source of Mura of the liquid crystal display. The testing method includes: applying the control signal to the switch unit; applying a data signal to the N data lines; determining the source of the Mura of the liquid crystal display according to a current brightness of the liquid crystal display; and stopping applying the control signal to the switch unit.

18 Claims, 8 Drawing Sheets

(52) U.S. Cl.
CPC ..... *G09G 2320/02* (2013.01); *G09G 2330/08* (2013.01); *G09G 2330/12* (2013.01)

(56) References Cited

U.S. PATENT DOCUMENTS

| | | | | |
|---|---|---|---|---|
| 2004/0051823 | A1* | 3/2004 | Choi | G02F 1/1368 349/43 |
| 2006/0145996 | A1 | 7/2006 | Chang | |
| 2008/0259061 | A1* | 10/2008 | Lin | G09G 3/3688 345/204 |
| 2009/0140968 | A1* | 6/2009 | Liao | G09G 3/3677 345/98 |
| 2010/0053055 | A1* | 3/2010 | Tsai | G09G 3/3648 345/94 |
| 2010/0090719 | A1* | 4/2010 | Peng | G09G 3/006 324/760.01 |
| 2011/0063336 | A1* | 3/2011 | Shih | G09G 3/3659 345/690 |
| 2013/0278855 | A1* | 10/2013 | Uemura | H01L 29/78606 349/46 |
| 2013/0307575 | A1 | 11/2013 | Peng et al. | |
| 2014/0091998 | A1* | 4/2014 | Ko | G09G 3/3674 345/100 |
| 2015/0022510 | A1* | 1/2015 | Yao | G09G 3/3659 345/211 |

FOREIGN PATENT DOCUMENTS

| | | |
|---|---|---|
| CN | 101639508 A | 2/2010 |
| CN | 201413440 Y | 2/2010 |
| CN | 101719352 A | 6/2010 |
| CN | 102315227 B | 4/2013 |

\* cited by examiner

LIQUID CRYSTAL DISPLAY AND METHOD FOR TESTING LIQUID CRYSTAL DISPLAY

CROSS-REFERENCES TO RELATED APPLICATIONS

This application claims the benefit of priority to Chinese Patent Application No. 201310488181.2, filed with the Chinese Patent Office on Oct. 17, 2013 and entitled "LIQUID CRYSTAL DISPLAY AND METHOD FOR TESTING LIQUID CRYSTAL DISPLAY", the content of which is incorporated herein by reference in its entirety.

TECHNICAL FIELD

The present disclosure relates to the technical field of liquid crystal displays, and in particular, to a liquid crystal display and a method for testing the liquid crystal display.

BACKGROUND OF THE INVENTION

A Thin Film Transistor Liquid Crystal Display (TFT-LCD) is a representative active matrix liquid crystal display. Due to its advantages such as good performance, ability of large-scale production, and high-level of automation, the TFT-LCD has been widely used in various fields such as laptops, video cameras, and digital camera monitors.

To improve the quality of a product, it is necessary to detect various undesirable phenomena of the product in time during the manufacture of the TFT-LCD. Mura (which refers to an uneven display brightness) is one common undesirable phenomenon during a detection of the TFT-LCD. There are two causes for the Mura phenomenon, either caused by an array process or caused by a cell process during the manufacture of the TFT-LCD. Based on different causes for the Mura phenomenon, different operations may be performed on the TFT-LCD with the Mura phenomenon. However, it is difficult to determine the reason causing the Mura phenomenon, hence, it is required to detect a source of the Mura.

A method for detecting the source of the Mura is disclosed in a Chinese Patent Application No. 201010223560.5, titled "THIN FILM TRANSISTOR ARRAY SUBSTRATE AND MANUFACTURE METHOD AND TESTING METHOD THEREOF". However, in the testing method provided in this application, it is necessary to drill a hole for soldering and the time required for the test is relatively long.

BRIEF SUMMARY OF THE INVENTION

The problem to be solved in the disclosure is to reduce the time required for detecting a source of Mura of a liquid crystal display.

To solve the above problem, a liquid crystal display is provided in the present disclosure. The liquid crystal display includes a TFT substrate and a drive power line. The TFT substrate includes M scan lines and N data lines. The liquid crystal display further includes a switch unit. The switch unit is adapted to connect the drive power line to the M scan lines under the control of a control signal during a detection of a source of Mura of the liquid crystal display.

Based on the above liquid crystal display, a method for testing the liquid crystal display is further provided. The method includes: applying a control signal to the switch unit; applying a data signal to the N data lines after the control signal has been applied to the switch unit; determining a source of Mura of the liquid crystal display according to a current brightness of the liquid crystal display, after the data signal has been applied on the N data lines; and stopping applying the control signal on the switch unit after the source of the Mura of the liquid crystal display is determined.

As compared with the prior art, a technical solution of the disclosure has at least one of the following advantages.

The liquid crystal display according to the disclosure includes the switch unit, and the switch unit is connected to the drive power line and all the scan lines on the TFT substrate. During the detection of the source of the Mura of the liquid crystal display, the switch unit receives a control signal provided by a control signal generation unit, the control signal controls the switch unit to be turned on, and all the scan lines are simultaneously driven by a voltage on the drive power line. Since all scan lines are driven at the same time, the Mura caused by a TFT feature is eliminated. If the Mura still exists during the detection, it may be determined that the Mura generated under a normal drive is caused by a cell process; or if the Mura disappears during the detection, it may be determined that the Mura generated under the normal drive is caused by an array process.

During the detection of the source of the Mura of the liquid crystal display, the switch unit only needs to receive the control signal provided by the control signal generation unit, while it is not required to drill a hole for soldering, thus no extra process is introduced and the detection time is accordingly reduced.

Furthermore, during the detection of the source of the Mura the liquid crystal display in the prior art, it is necessary to detect an input voltage and an output voltage, and thus a detection device needs to be added. While during the detection of the source of the Mura of the liquid crystal display in the disclosure, it is not necessary to measure the input voltage and the output voltage, thus no extra detection device is necessary and the detection cost is accordingly reduced.

In an alternative solution of the disclosure, the switch unit includes a plurality of transistors, and the liquid crystal display further includes an electrical fuse. The control signal is received via the electrical fuse by gates of the plurality of transistors. After the source of the Mura of the liquid crystal display is determined, the control signal generation unit applies a high voltage to blow the fuse and accordingly the switch unit does not function, hence, it is effectively ensured that other functions of the liquid crystal display are not affected.

In another alternative solution of the disclosure, the switch unit includes a plurality of transistors, and the TFT substrate includes a glass substrate. Gates of the transistors are connected to a grounding pad of a flexible circuit board on a glass substrate. After the source of the Mura of the liquid crystal display has been determined, the gates of the plurality of transistors are connected to the grounding pad of the flexible circuit board during a soldering process of a drive chip and the flexible circuit board, hence, paths for discharging static electricity are increased and the anti-electrostatic discharging ability of the liquid crystal display is enhanced.

DETAILED DESCRIPTION OF THE INVENTION

As described in the background, various tests need to be performed on the product during the manufacture of the TFT-LCD, to find out various undesirable phenomena existing in the product. After a cell process, and before soldering of a drive chip and a flexible circuit board, a visual test is to be performed on the liquid crystal display.

Figure 1:
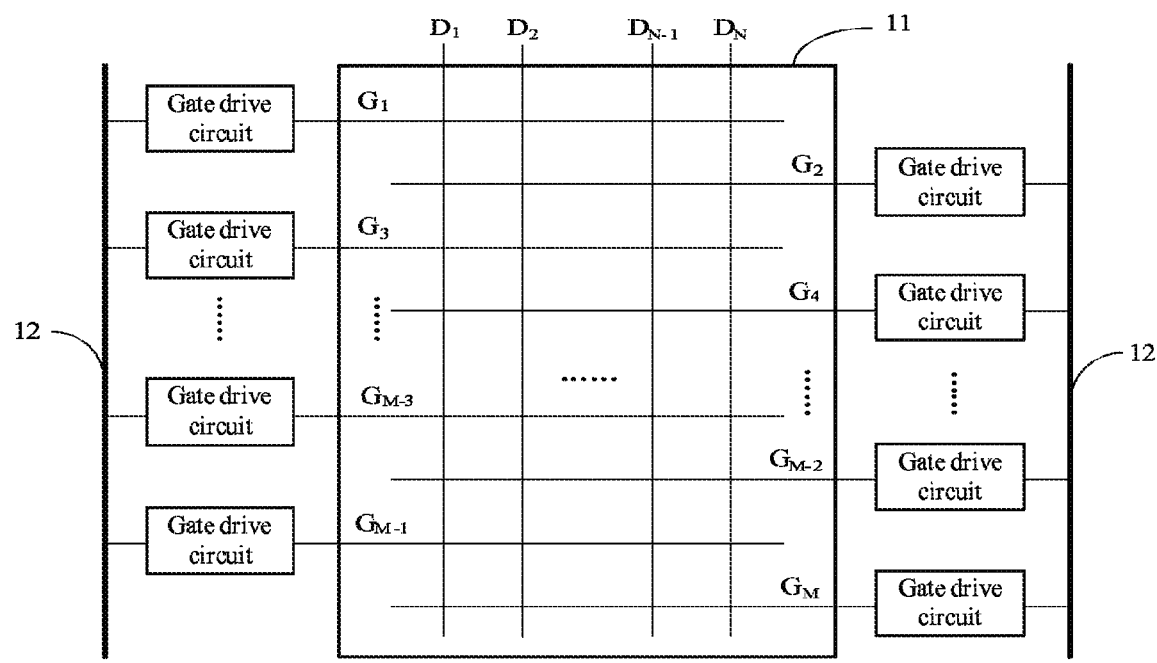
FIG. 1 is a schematic structural diagram of an existing liquid crystal display.

FIG. 1 is a schematic structure diagram of an existing liquid crystal display after the cell process and before the soldering of the drive chip and the flexible circuit board. Referring to FIG. 1, the liquid crystal display includes a TFT substrate 11, a drive power line 12 and a plurality of gate drive circuits. The TFT substrate 11 includes M scan lines and N data lines. The M scan lines are respectively a scan line $G_1$, a scan line $G_2$, a scan line $G_3$, a scan line $G_4$, ..., a scan line $G_{M-3}$, a scan line $G_{M-2}$, a scan line $G_{M-1}$ and a scan line $G_M$. The N data lines are respectively a data line $D_1$, a data line $D_2$, ..., a data line $D_{N-1}$ and a data line $D_N$. The drive power line 12 is adapted to provide a drive supply voltage to the plurality of gate drive circuits, and each gate drive circuit is adapted to provide a scan voltage to one of the scan lines.

When the visual test is performed on the liquid crystal display shown in FIG. 1, it is observed whether the liquid crystal display has a Mura phenomenon under a normal drive. Specifically, after the liquid crystal display is powered, an enabling signal and a clock signal are provided to the plurality of gate drive circuits by an LCD test fixture, and a data signal is provided to the N data lines by the LCD test fixture, and the liquid crystal display performs interlaced scanning During the scanning, it is observed whether the liquid crystal display has the Mura phenomenon.

If the liquid crystal display has the Mura phenomenon, different operations are performed on the liquid crystal display according to different reasons causing the Mura. Thus, it is necessary to detect a source of the Mura of the liquid crystal display.

A liquid crystal display is provided in technical solutions of the disclosure. The liquid crystal display includes a TFT substrate and a drive power line. The TFT substrate includes M scan lines and N data lines, and further includes a switch unit. The switch unit is adapted to connect the drive power line and the M scan lines under the control of a control signal during the detection of the source of the Mura of the liquid crystal display.

Specifically, during the detection of the source of the Mura of the liquid crystal display, the control signal is provided by a control signal generation unit, the control signal generation unit controls the switch unit to turn on, and the M scan lines are simultaneously driven by a drive supply voltage on the drive power line. After the control signal is generated, a data signal is applied to the N data lines, and it is observed whether the Mura existing in the liquid crystal display under the normal drive is eliminated.

There are two causes for the Mura phenomenon, either caused by an array process or caused by the cell process during manufacture. The Mura phenomenon caused by the array process refers to the fact that, a drift of a characteristic curve of a switching transistor in a TFT array slows charging/discharging of pixels, incomplete discharging of the pixels is caused during a switching procedure of the switching transistor, and finally the Mura phenomenon exists on the liquid crystal display.

With the liquid crystal display provided in the technical solutions of the disclosure, since the M scan lines are driven simultaneously during the detection and all switching transistors in the TFT array are turned on simultaneously, the pixels are discharged completely, and the Mura caused by the TFT feature is eliminated, i.e., the Mura caused by the array process is eliminated. If the Mura phenomenon still exists during the detection, it may be determined that the Mura generated under the normal drive is caused by the cell process; or if the Mura disappears during the detection, it may be determined that the Mura generated under the normal drive is caused by the array process.

In the disclosure, during the detection of the source of the Mura of the liquid crystal display, it is merely required that the control signal generation unit provides the control signal, while it is unnecessary to drill a hole for soldering, thus no extra process is introduced and the detection time is accordingly reduced.

To make the above objects, features and advantages of the disclosure easier to be understood, embodiments of the disclosure are described in detail hereinafter in conjunction with the drawings.

It should be noted that among the M scan lines shown in FIG. 1, input terminals of odd numbered scan lines and input terminals of even numbered scan lines are respectively located on opposite sides of the TFT substrate 11, i.e., the scan line $G_1$, the scan line $G_3$, ..., the scan line $G_{M-3}$ and the scan line $G_{M-1}$ are located on the left side of the TFT substrate 11, and the scan line $G_2$, the scan line $G_4$, ..., the scan line $G_{M-2}$ and the scan line $G_M$ are located on the right side of the TFT substrate 11. In the following embodiments, the description is given based on the arrangement that the input terminals of the odd numbered scan lines and the input terminals of the even numbered scan lines among the M scan lines are respectively located on the opposite sides of the TFT substrate. In other embodiments, the input terminals of the M scan lines may also be disposed on a same side of the TFT substrate, which is not limited in the disclosure.

A First Embodiment

Figure 2:
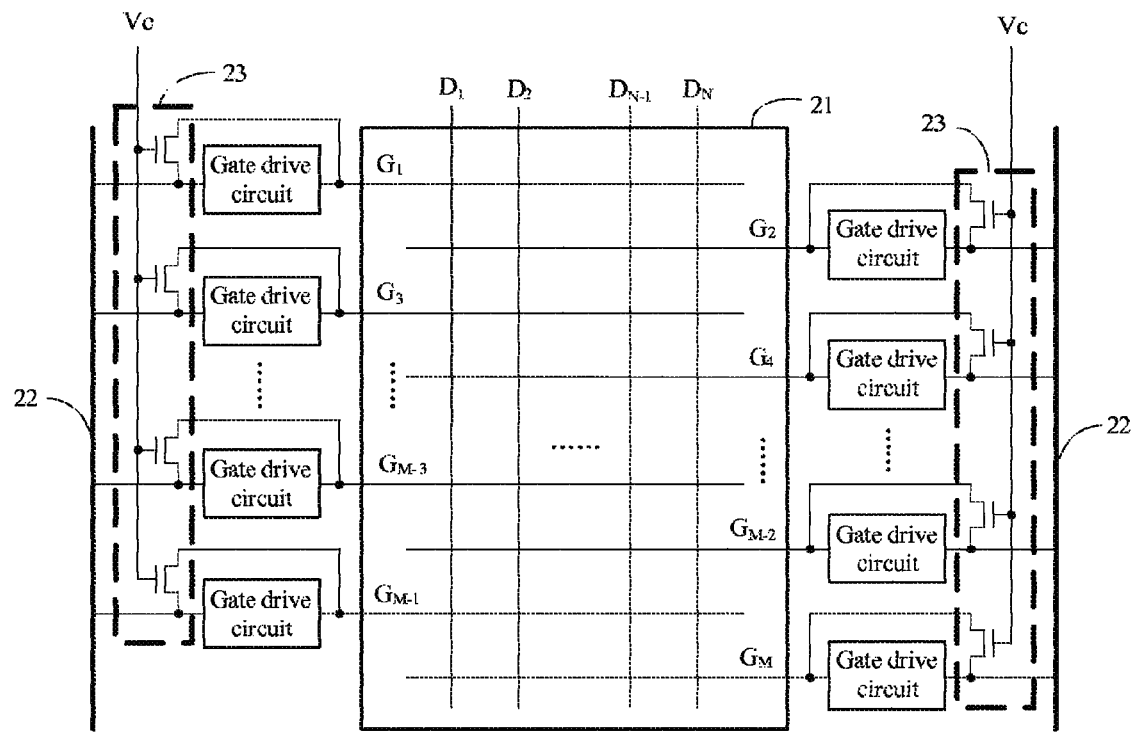
FIG. 2 is a schematic structural diagram of a liquid crystal display according to a first embodiment of the disclosure.

FIG. 2 is a schematic structure diagram of a liquid crystal display according to the first embodiment of the disclosure. The liquid crystal display shown in FIG. 2 includes a TFT substrate 21, a driving power line 22, a plurality of gate drive circuits, and a switch unit 23.

The TFT substrate 21 includes M scan lines and N data lines. The M scan lines are respectively a scan line $G_1$, a scan line $G_2$, a scan line $G_3$, a scan line $G_4$, ..., a scan line $G_{M-3}$, a scan line $G_{M-2}$, a scan line $G_{M-1}$ and a scan line $G_M$. The N data lines are respectively a data line $D_1$, a data line $D_2$, ..., a data line $D_{N-1}$ and a data line $D_N$. The drive power line 22 is adapted to provide a drive supply voltage to the plurality of gate drive circuits, and each gate drive circuit is adapted to provide a scan voltage to one of the scan lines.

The switch unit 23 is adapted to connect the drive power line 22 and the M scan lines under the control of a control signal Vc during a detection of a source of Mura of the liquid crystal display.

Specifically, the control signal Vc is provided by a control signal generation unit (not shown) and is adapted to control the switch unit 23 to be turned on. Specifically, the control signal Vc is a direct current voltage signal. In one embodiment, the control signal generation unit is an LCD test fixture, and the direct current voltage signal is provided by the LCD test fixture. In another embodiment, the control signal generation unit may also include other voltage sources that may provide direct current voltage signals, which is not limited in the disclosure.

The control signal generation unit is further adapted to stop generating the control signal Vc when the detection of the source of the Mura of the liquid crystal display is not performed, i.e., the control signal generation unit may not output the control signal Vc when the detection of the source of the Mura of the liquid crystal display is not performed.

The switch unit 23 includes M transistors having respective gates connected to the control signal Vc, which is generated by the control signal generation unit. A first electrode of each transistor is connected to the drive power line 22, and a second electrode of each transistor is correspondingly connected to one of the scan lines.

According to the embodiment, all the M transistors are NMOS transistors, the first electrodes of the transistors are drains of the NMOS transistors, and the second electrodes of the transistors are sources of the NMOS transistors. Since all the M transistors are NMOS transistors, the control signal Vc is a high-level signal, and the voltage of the control signal Vc is set according to voltage thresholds of the respective transistors.

Correspondingly, according to other embodiments, if all the M transistors are PMOS transistors, the first electrodes of the transistors are sources of the PMOS transistors, the second electrodes of the transistors are drains of the PMOS transistors, and the control signal Vc is a low-level signal. Similarly, in the case where some of the M transistors are PMOS transistors and the others of the M transistors are NMOS transistors, corresponding transformations may be made by those skilled in the art according to the spirit of the disclosure to achieve the effects of the switch unit 22, which is not enumerated exhaustively.

When switching transistors in a TFT array are manufactured, the M transistors together with a related connection line are manufactured on a glass substrate of the TFT substrate, and no extra process is needed.

During the detection of the source of the Mura of the liquid crystal display according to the embodiment, the control signal Vc is applied to the switch unit 23 by the control signal generation unit. Specifically, according to the embodiment, the gates of the M transistors are connected to the LCD test fixture via the connection line. After the connection, the LCD test fixture outputs the high-level control signal Vc.

After the control signal Vc has been applied to the switch unit 23, a data signal is applied to the N data lines. The M transistors in the switch unit 23 are turned on under the control of the control signal Vc, and the M scan lines are simultaneously driven by the drive supply voltage on the drive power line 22. After the data signal is applied, it is observed whether the Mura phenomenon still exists on the liquid crystal display.

Since the M scan lines are driven simultaneously, all the switching transistors in the TFT array are turned on at the same time, pixels are discharged completely, and the Mura caused by the TFT feature is accordingly eliminated, i.e., the Mura caused by an array process is eliminated. If the Mura still exists during the detection, it may be determined that the Mura generated under a normal drive is caused by a cell process; or if the Mura disappears during the detection, it may be determined that the Mura generated under the normal drive is caused by the array process.

After the source of the Mura of the liquid crystal display is determined, the control signal generation unit stops applying the control signal Vc on the switch unit 23. Specifically, the LCD test fixture stops generating the control signal Vc, and disconnects the connection line between the LCD test fixture and the switch unit 23.

As compared with the prior art, during the detection of the source of the Mura of the liquid crystal display, the switch unit 23 only needs to receive the control signal Vc provided by the control signal generation unit, while it is not required to drill a hole for soldering, thus no extra process is introduced and the detection time is accordingly reduced.

Furthermore, during the detection of the source of the Mura of the liquid crystal display in the prior art, it is necessary to detect an input voltage and an output voltage, thus a detection device needs to be added. While during the detection of the source of the Mura of the liquid crystal display according to the embodiment, it is unnecessary to measure the input voltage and the output voltage, and the control signal generation unit is embodied as the existing LCD test fixture, thus no extra detection device is necessary and the detection cost is accordingly reduced.

A Second Embodiment

Figure 3:
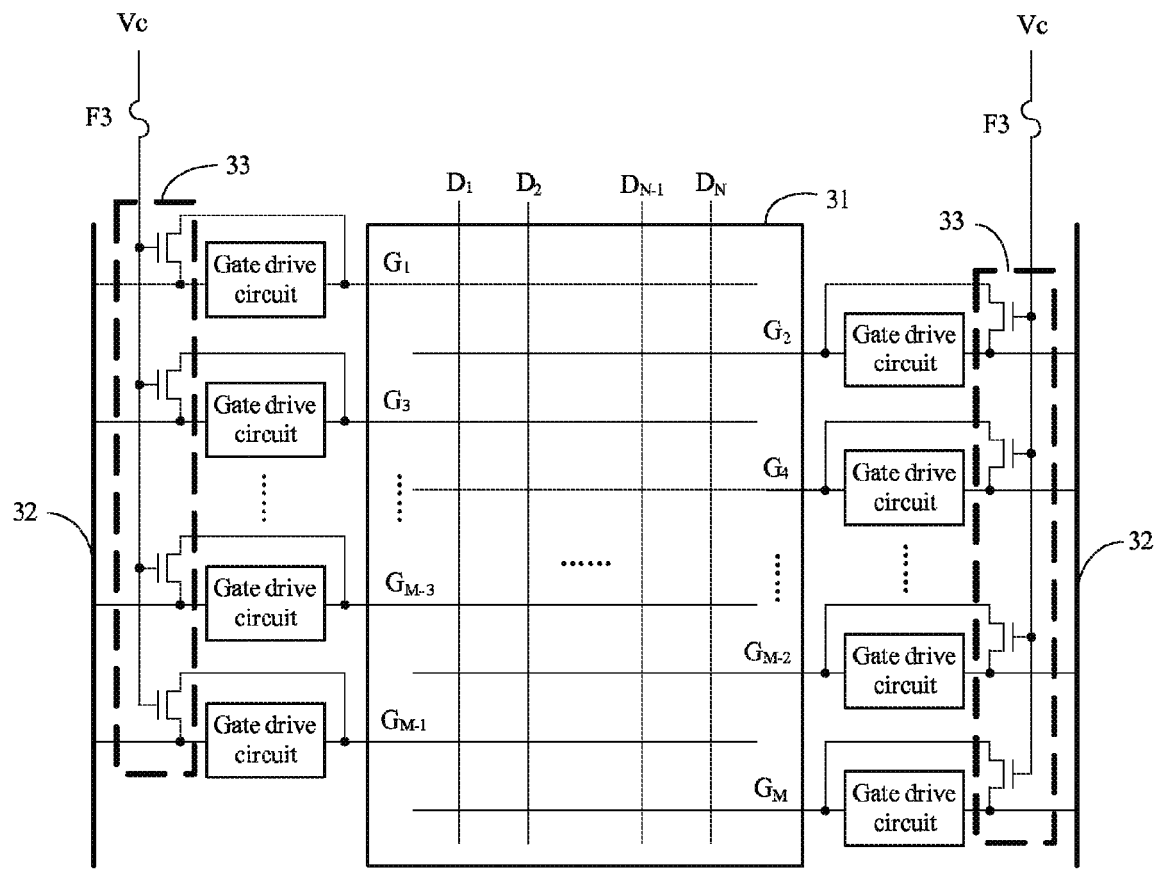
FIG. 3 is a schematic structural diagram of a liquid crystal display according to a second embodiment of the disclosure.

FIG. 3 is a schematic structure diagram of a liquid crystal display according to the second embodiment of the disclosure. The liquid crystal display shown in FIG. 3 includes a TFT substrate 31, a driving power line 32, a switch unit 33, a plurality of gate drive circuits, and an electrical fuse (E-fuse) F3. E-fuse F3 is shown twice in the right-hand side and in the left-hand side of FIG. 3 for the sake of clarity. It is to be understood that E-fuse F3 can be a single fuse according to embodiments of the present invention. The TFT substrate 31, the driving power line 32 and the switch unit 33 are respectively similar to those according to the first embodiment, and structures and functions of the TFT substrate 31, the driving power line 32 and the switch unit 33 may be referred to the description of the first embodiment.

According to the embodiment, gates of M transistors in the switch unit 33 receive, via the E-fuse F3, a control signal Vc generated by a control signal generation unit. The E-fuse F3 is equivalent to an electrical wire when the control signal Vc is received, and is blown when a high voltage is received.

When switching transistors in a TFT array are manufactured, the M transistors and the E-fuse F3 together with a related connection line are manufactured on a glass substrate of the TFT substrate, and no extra process is needed.

A procedure of detecting a source of Mura of the liquid crystal display according to the embodiment is similar to that of the first embodiment. from the difference between the first and second embodiments is that, after the source of the Mura of the liquid crystal display has been determined, the control signal generation unit stops outputting the control signal Vc and applies a high voltage on the E-fuse F3 to blow the E-fuse F3 to disable the switch unit 33. After the E-fuse F3 has been blown, the switch unit 33 will not be turned on even if the control signal Vc is again applied to the liquid crystal display according to the second embodiment.

According to the embodiment, the high voltage for blowing the E-fuse F3 is provided by the control signal generation unit, i.e., the LCD test fixture. According to other embodiments, the high voltage for blowing the E-fuse F3 may also be provided by a voltage source that may output a high direct current voltage, which is not limited according to the embodiment.

In one embodiment, after the source of the Mura of the liquid crystal display has been determined, the high voltage is applied to blow the E-fuse F3 and accordingly the switch unit 33 is disabled. Hence, a case that the switch unit 33 is turned on when the control signal Vc is unintentionally applied and thereby affecting other functions of the liquid crystal display can be prevented.

A Third Embodiment

Figure 4:
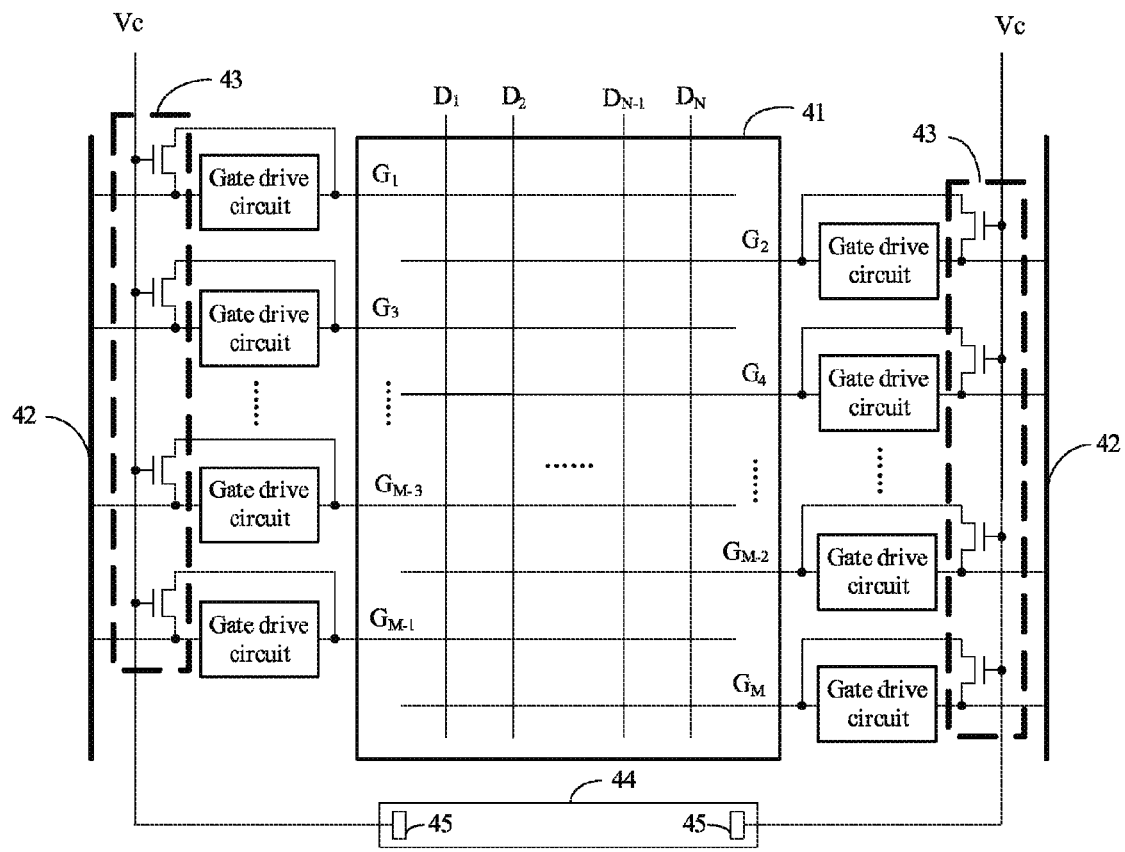
FIG. 4 is a schematic structural diagram of a liquid crystal display according to a third embodiment of the disclosure.

FIG. 4 is a schematic structure diagram of a liquid crystal display according to the third embodiment of the disclosure. The liquid crystal display shown in FIG. 4 includes a TFT substrate 41, a driving power line 42, a switch unit 43 and a plurality of gate drive circuits. The TFT substrate 41, the driving power line 42 and the switch unit 43 are respectively similar to those in the first embodiment, and structures and functions of the TFT substrate 41, the driving power line 42 and the switch unit 43 may be referred to the description of the first embodiment and are not described in detail herein for the sake of brevity.

The third embodiment is different from the first embodiment in that after a source of Mura of the liquid crystal display is detected, gates of M transistors in the switch unit 43 are connected to a grounding pad of a flexible circuit board disposed on a glass substrate during a soldering process of a drive chip and the flexible circuit board.

Specifically, after the source of the Mura of the liquid crystal display is detected, the manufacture of the liquid crystal display proceeds to the soldering process of the drive chip and the flexible circuit board. The flexible circuit board 44 shown in FIG. 4 includes the grounding pad 45. When the flexible circuit board 44 is soldered onto the glass substrate, the gates of the M transistors are connected to the grounding pad 45 to form a loop to the ground. The loop to the ground has the function of discharging static electricity, and anti-electrostatic ability of the liquid crystal display is consequently enhanced.

A Fourth Embodiment

Figure 5:
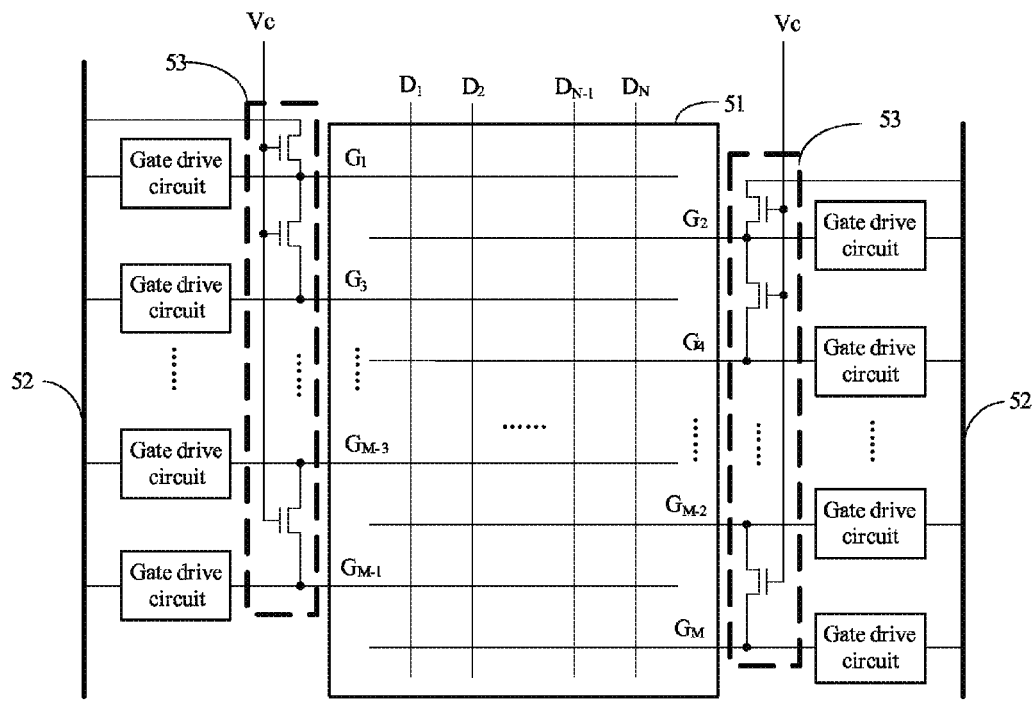
FIG. 5 is a schematic structural diagram of a liquid crystal display according to a fourth embodiment of the disclosure.

FIG. 5 is a schematic structure diagram of a liquid crystal display according to the fourth embodiment of the disclosure. The liquid crystal display shown in FIG. 5 includes a TFT substrate 51, a driving power line 52, a switch unit 53 and a plurality of gate drive circuits. The TFT substrate 51 and the driving power line 52 are respectively similar to those according to the first embodiment, and structures and functions of the TFT substrate 51 and the driving power line 52 may be referred to the description of the first embodiment.

The switch unit 53 includes M transistors. Gates of respective transistors are electrically connected to a control signal Vc, which is generated by a control signal generation unit (not shown). In one embodiment, input terminals of odd numbered scan lines and input terminals of even numbered scan lines among the M scan lines are respectively located on opposite sides of the TFT substrate 51. Thus, a first electrode of an mth transistor is correspondingly connected to an m−2th scan line, a second electrode of the mth transistor is correspondingly connected to an mth scan line, where $2<m\leq M$, and the first electrode of a first transistor and the first electrode of a second transistor are connected to the drive power line 52.

In another embodiment, if the input terminals of the M scan lines are located on a same side of the TFT substrate 51, the first electrode of the mth transistor is correspondingly connected to the m−1th scan line, the second electrode of the mth transistor is correspondingly connected to the mth scan line, where $1<m\leq M$, and the first electrode of the first transistor is connected to the drive power line 52.

In one embodiment, all the M transistors are NMOS transistors, the first electrodes of the transistors are drains of the NMOS transistors, and the second electrodes of the transistors are sources of the NMOS transistors. Since all the M transistors are NMOS transistors, the control signal Vc is a high-level signal, and the voltage of the control signal Vc is set according to voltage thresholds of respective transistors.

In another embodiment, if all the M transistors are PMOS transistors, the first electrodes of the transistors are sources of the PMOS transistors, the second electrodes of the transistors are drains of the PMOS transistors, and the control signal Vc is a low-level signal. Similarly, in the case that some of the M transistors are PMOS transistors and the other of the M transistors are NMOS transistors, corresponding adjustments may be made by those skilled in the art according to the spirit of the disclosure achieve the effects of the switch unit 53, which is not enumerated exhaustively.

When switching transistors in a TFT array are manufactured, the M transistors together with a related connection line are manufactured on a glass substrate of the TFT substrate, and no extra process is needed.

A procedure for detecting a source of Mura of the liquid crystal display according to the embodiment is similar to that according to the first embodiment, which is not described in detail here. With the liquid crystal display according to the embodiment, during a detection of the source of the Mura of the liquid crystal display, the detection time is shortened and the detection cost is reduced.

A Fifth Embodiment

Figure 6:
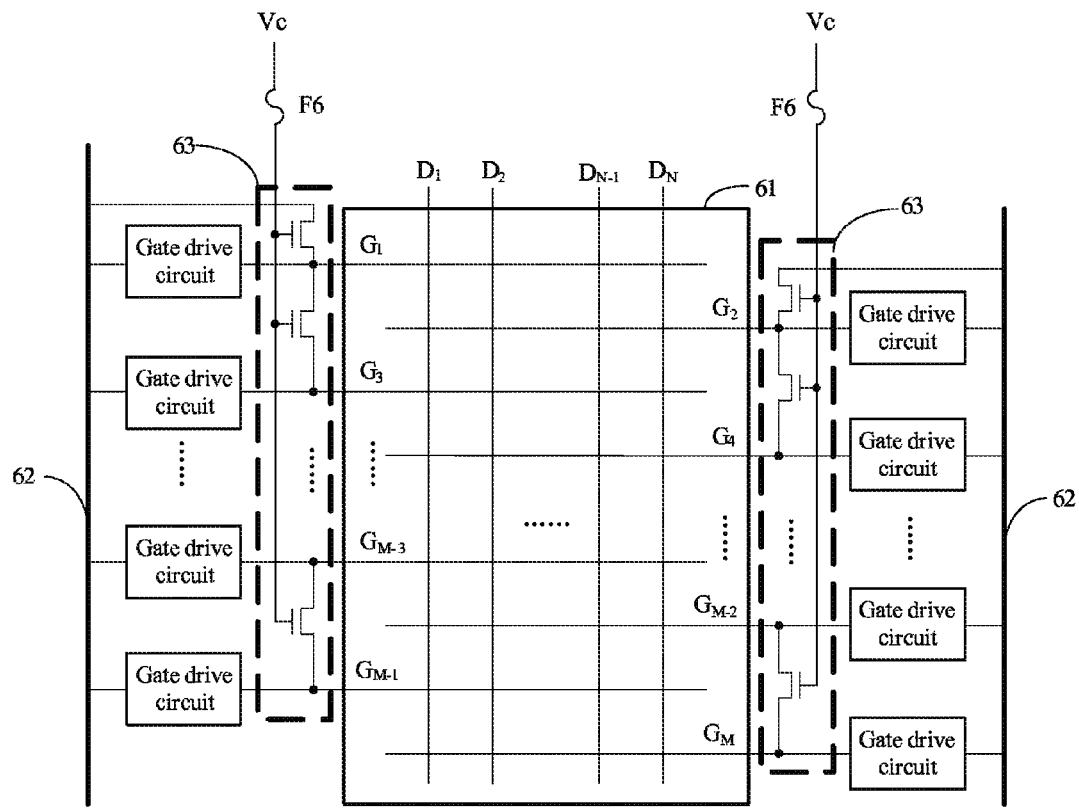
FIG. 6 is a schematic structural diagram of a liquid crystal display according to a fifth embodiment of the disclosure.

FIG. 6 is a schematic structure diagram of a liquid crystal display according to the fifth embodiment of the disclosure. The liquid crystal display shown in FIG. 6 includes a TFT substrate 61, a driving power line 62, a switch unit 63, a plurality of gate drive circuits, and an E-fuse F6. Two fuses are shown in FIG. 6 for purposes of illustration, it is to be understood that fewer or more fuses may also be used in some embodiments. The TFT substrate 61, the driving power line 62 and the switch unit 63 are respectively similar to those according to the fourth embodiment, and structures and functions of the TFT substrate 61, the driving power line 62 and the switch unit 63 may be referred to the description of the fourth embodiment, and the function of the E-fuse F6 may be referred to the description of the second embodiment, which are not described in detail herein.

A source of Mura of the liquid crystal display according to the embodiment is detected, and after the source of the Mura of the liquid crystal display is determined, a high voltage is applied to blow the E-fuse F6, and accordingly the switch unit 63 is disabled. Hence, a case that the switch unit 63 is turned on when the control signal Vc is unintentionally applied, thereby affecting other functions of the liquid crystal display can be prevented.

A Sixth Embodiment

Figure 7:
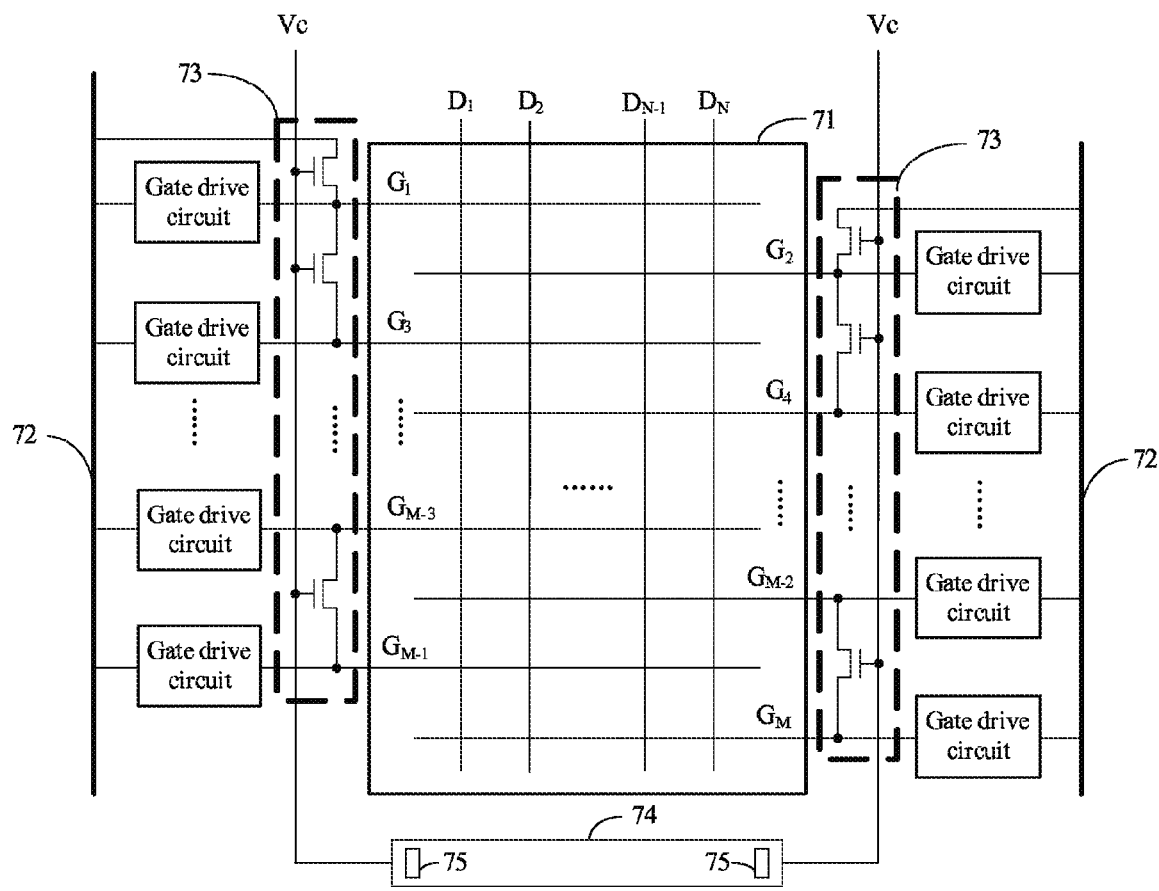
FIG. 7 is a schematic structural diagram of a liquid crystal display according to a sixth embodiment of the disclosure.

FIG. 7 is a schematic structure diagram of a liquid crystal display according to the sixth embodiment of the disclosure. The liquid crystal display shown in FIG. 7 includes a TFT substrate 71, a driving power line 72, a switch unit 73 and a plurality of gate drive circuits. The TFT substrate 71, the driving power line 72 and the switch unit 73 are respectively similar to those according to the fourth embodiment, which are not described in detail here.

The embodiment is different from the fourth embodiment in that after a source of Mura of the liquid crystal display is detected, gates of M transistors in the switch unit 73 are connected to a grounding pad of a flexible circuit board on a glass substrate during a soldering process of a drive chip and the flexible circuit board.

Specifically, after the source of the Mura of the liquid crystal display is detected, the manufacture of the liquid crystal display proceeds to the soldering process of the drive chip and the flexible circuit board. The flexible circuit board 74 shown in FIG. 7 includes the grounding pad 75. When the flexible circuit board 74 is soldered onto the glass substrate, the gates of the M transistors are connected to the grounding pad 75 to form a loop to the ground. The loop to the ground is adapted to discharge static electricity, and the anti-electrostatic discharging ability of the liquid crystal display is enhanced.

Figure 8:
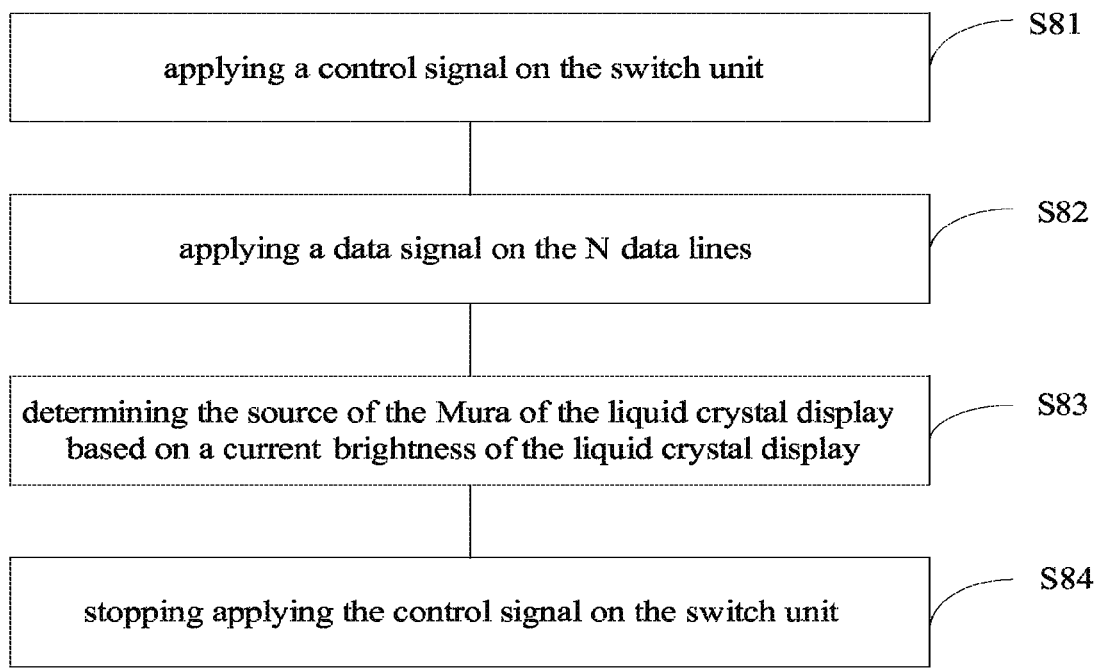
FIG. 8 is a simplified flow chart of a method for testing a liquid crystal display according to an embodiment of the disclosure.

Based on the above embodiments, a method for detecting a source of Mura of a liquid crystal display is further provided in the technical solutions of the disclosure. The liquid crystal display may have a structure as shown in any one of FIG. 2 to FIG. 7. FIG. 8 is a simplified flow chart of a method for testing a liquid crystal display according to some embodiments of the disclosure. As shown in FIG. 8, the method includes steps S81 to S84.

In step S81, a control signal is applied to the switch unit.

After the control signal has been applied to the switch unit, the procedure proceeds to step S82. In step S82, a data signal is applied to the N data lines.

After the data signal has been applied to the N data lines, the procedure proceeds to step S83. In step S83, a source of Mura of the liquid crystal display is determined according to a current brightness of the liquid crystal display.

After the source of the Mura of the liquid crystal display has been determined, the procedure proceeds to step S84. In step S84, the control signal generator unit stops applying the control signal to the switch unit.

Implementation of the method may be referred to the description of the first embodiment, which is not described in detail herein.

In conclusion, with the liquid crystal display and the method for testing the liquid crystal display provided in the technical solutions of the disclosure, time required for detecting the source of the Mura of the liquid crystal display may be shortened and the cost of the detection may be reduced.

Although the invention has been described with respect to specific embodiments, it will be appreciated that the invention is intended to cover all modifications and equivalents within the scope of the following claims.

What is claimed is:

1. A liquid crystal display comprising:
   a Thin Film Transistor (TFT) substrate having M scan lines and N data lines defining a plurality of pixels, where M and N are positive integers;
   a plurality of switching transistors arranged in a TFT array disposed on the TFT substrate;
   a drive power line;
   a control signal generation unit providing a control signal; and
   a switch unit comprising P transistors, each having a gate electrode, a first electrode, and a second electrode, wherein the gate electrode of each of the P transistors connects to the control signal, wherein the first electrode of each of the P transistors directly connects to the drive power line, and the second electrode of each of the P transistors directly connects to one of the M scan lines, wherein M and P are equal numbers; and
   a plurality of gate drive circuits, each having an input terminal and an output terminal, wherein the input terminal of each of the plurality of gate drive circuits is directly connected to the drive power line, and wherein the output terminal of each of the plurality of gate drive circuits is directly connected to one of the M scan lines;
   wherein the switch unit concurrently drives the M scan lines and turns on all the switching transistors in the TFT array, and wherein each of the plurality of pixels is discharged completely during a detection of a source of a Mura of the liquid crystal display.

2. The liquid crystal display according to claim 1, wherein the control signal generation unit is a test fixture for the liquid crystal display.

3. The liquid crystal display according to claim 1, wherein the control signal generation unit is adapted to stop generating the control signal when the detection of the source of the Mura of the liquid crystal display is not performed.

4. The liquid crystal display according to claim 2, wherein the control signal generation unit is adapted to stop generating the control signal when the detection of the source of the Mura of the liquid crystal display is not performed.

5. The liquid crystal display according to claim 1, wherein the TFT substrate comprises a glass substrate, and the gates of the P transistors are connected to a grounding pad of a flexible circuit board on the glass substrate.

6. The liquid crystal display according to claim 1, further comprising an electrical fuse through which the control signal is received by the gates of the P transistors.

7. The liquid crystal display according to claim 1, wherein the input terminals of odd numbered scan lines and the input terminals of even numbered scan lines among the M scan lines are respectively disposed on opposite sides of the TFT substrate.

8. The liquid crystal display according to claim 1, wherein all input terminals of the M scan lines are located on a same side of the TFT substrate.

9. A method for testing an liquid crystal display comprising:
   providing the liquid crystal display comprises a Thin Film Transistor (TFT) substrate having M scan lines and N data lines defining a plurality of pixels, a drive power line, a plurality of gate drive circuits and a switch unit adapted to connect the drive power line to the M scan lines under control of a control signal during a detection of a source of a Mura of the liquid crystal display, wherein the plurality of gate drive circuits each has an input terminal and an output terminal wherein the input terminal of each of the plurality of gate drive circuits is directly connected to the drive power line, and wherein the output terminal of each of the plurality of gate drive circuits is directly connected to one of the M scan lines; wherein, M and N are positive integers;

applying the control signal to the switch unit to concurrently drive the M scan lines and to turn on all switching transistors in a TFT array disposed on the TFT substrate, wherein each of the plurality of pixels is discharged completely during a detection of a source of a Mura of the liquid crystal display;

applying a data signal to the N data lines after the control signal has been applied to the switch unit;

determining the source of the Mura of the liquid crystal display based on a current brightness of the liquid crystal display after the data signal has been applied to the N data lines; and stopping the applying the control signal to the switch unit, after the source of the Mura of the liquid crystal display has been determined;

wherein the switch unit comprises P transistors, each having a gate electrode, a first electrode, and a second electrode, wherein the gate electrode of each of the P transistors connects to the control signal, the first electrode of each of the P transistors connects to the drive power line, and the second electrode of each of the P transistors directly connects to one of the M scan lines, wherein M and P are equal; and wherein the applying the control signal to the switch unit comprises: applying the control signal to the gates of the P transistors.

10. The method according to claim 9, wherein the first electrode of the $p^{th}$ transistor connects to the $(m-1)^{th}$ scan line, the second electrode of the $p^{th}$ transistor to the $m^{th}$ scan line, and wherein the first electrode of a first transistor is connected to the drive power line, where m and p are equal positive integers and $1<m\leq M$.

11. A liquid crystal display comprising:
a Thin Film Transistor (TFT) substrate having M scan lines and N data lines defining a plurality of pixels, where M and N are positive integers;
a plurality of switching transistors arranged in a TFT array disposed on the TFT substrate;
a drive power line;
a control signal generation unit providing a control signal;
a switch unit comprising P transistors, each having a gate electrode, a first electrode, and a second electrode, wherein the gate electrode of each of the P transistors connects to the control signal, the first electrode of the $p^{th}$ transistor connects to the $(m-1)^{th}$ scan line, the second electrode of the $p^{th}$ transistor connects to the $m^{th}$ scan line, and wherein the first electrode of the first transistor is directly connected to the drive power line, wherein m is a positive integer greater than 2, p equals to m, P equals to M, and $1<m\leq M$; and a plurality of gate drive circuits, each having an input terminal and an output terminal, wherein the input terminal of each of the plurality of gate drive circuits is directly connected to the drive power line, and wherein the output terminal of each of the plurality of gate drive circuits is directly connected to one of the M scan lines;

wherein the switch unit concurrently drives the M scan lines and turns on all the switching transistors in the TFT array, and wherein each of the plurality of pixels is discharged completely during a detection of a source of a Mura of the liquid crystal display.

12. The liquid crystal display according to claim 11, wherein the control signal generation unit is a test fixture for the liquid crystal display.

13. The liquid crystal display according to claim 11, wherein the control signal generation unit is adapted to stop generating the control signal when the detection of the source of the Mura of the liquid crystal display is not performed.

14. The liquid crystal display according to claim 12, wherein the control signal generation unit is adapted to stop generating the control signal when the detection of the source of the Mura of the liquid crystal display is not performed.

15. The liquid crystal display according to claim 11, wherein the TFT substrate comprises a glass substrate, and the gates of the P transistors are connected to a grounding pad of a flexible circuit board on the glass substrate.

16. The liquid crystal display according to claim 11, further comprising an electrical fuse through which the control signal is received by the gates of the P transistors.

17. The liquid crystal display according to claim 11, wherein the input terminals of odd numbered scan lines and the input terminals of even numbered scan lines among the M scan lines are respectively disposed on opposite sides of the TFT substrate.

18. The liquid crystal display according to claim 11, wherein all input terminals of the M scan lines are located on a same side of the TFT substrate.

* * * * *